United States Patent
Luo et al.

(10) Patent No.: US 12,537,206 B2
(45) Date of Patent: Jan. 27, 2026

(54) METHODS FOR MANUFACTURING BATTERIES AND RELATED SYSTEMS

(71) Applicant: BATTELLE SAVANNAH RIVER ALLIANCE, LLC, Aiken, SC (US)

(72) Inventors: Yuefeng Luo, North Augusta, SC (US); Charles James, North Augusta, SC (US); Prabhu Ganesan, Aiken, SC (US)

(73) Assignee: Battelle Savannah River Alliance, LLC, Aiken, SC (US)

(*) Notice: Subject to any disclaimer, the term of this patent is extended or adjusted under 35 U.S.C. 154(b) by 590 days.

(21) Appl. No.: 17/877,397

(22) Filed: Jul. 29, 2022

(65) Prior Publication Data
US 2024/0039008 A1  Feb. 1, 2024

(51) Int. Cl.
*H01M 6/40* (2006.01)
*H01M 4/04* (2006.01)
(Continued)

(52) U.S. Cl.
CPC ........... *H01M 6/40* (2013.01); *H01M 4/0414* (2013.01); *H01M 10/0525* (2013.01); *H01M 10/0585* (2013.01)

(58) Field of Classification Search
CPC .. H01M 6/40; H01M 4/0414; H01M 10/0525; H01M 10/0585
See application file for complete search history.

(56) References Cited

U.S. PATENT DOCUMENTS 5,350,645 A * 9/1994 Lake .................. H01M 4/0402
429/246
6,694,875 B2 2/2004 Takahashi et al.
(Continued)

FOREIGN PATENT DOCUMENTS

JP 2016207540 A 12/2016
JP 2019061943 A * 4/2019 ........ H01M 10/0525
(Continued)

OTHER PUBLICATIONS

Machine Translation of JP2016207540A1 (Mar. 11, 2025) (Year: 2025).*
(Continued)

*Primary Examiner* — Matthew J Merkling
(74) *Attorney, Agent, or Firm* — Dority & Manning, P.A.

(57) ABSTRACT

In one aspect, a method for manufacturing a battery includes forming a battery cell relative to a substrate using a layer-deposition sub-process, with the layer-deposition sub-process including: depositing a layer of first electrode material relative to the substrate; depositing a first layer of electrolyte material on top of the layer of first electrode material; depositing a layer of second electrode material on top of the first layer of electrolyte material; and depositing a second layer of electrolyte material on top of the layer of second electrode material. Additionally, the method includes cycling through the layer-deposition sub-process one or more additional times to form one or more additional battery cells relative to the substrate, with each additional battery cell being formed on top of a previously formed battery cell such that a battery cell stack is created relative to the substrate.

21 Claims, 7 Drawing Sheets

(51) Int. Cl.
    *H01M 10/0525*      (2010.01)
    *H01M 10/0585*      (2010.01)

(56) References Cited

U.S. PATENT DOCUMENTS

| | | | |
|---|---|---|---|
| 7,939,195 | B2 | 5/2011 | Salot et al. |
| 7,998,329 | B2 | 8/2011 | Shiota et al. |
| 9,595,719 | B2 | 3/2017 | Matsunaga et al. |
| 10,462,907 | B2 | 10/2019 | Lewis et al. |
| 10,547,044 | B2 | 1/2020 | Wang et al. |
| 2001/0017086 | A1 | 8/2001 | Takahashi et al. |
| 2005/0106435 | A1* | 5/2005 | Jang ............... H01M 4/8867 429/510 |
| 2011/0129732 | A1 | 6/2011 | Bachrach et al. |
| 2012/0270114 | A1* | 10/2012 | Reynolds ............ H01M 4/0402 29/623.5 |
| 2015/0079457 | A1 | 3/2015 | Noguchi |
| 2016/0126558 | A1 | 5/2016 | Lewis et al. |
| 2016/0301082 | A1 | 10/2016 | Oriakhi et al. |
| 2017/0104204 | A1* | 4/2017 | Zhamu ............... H01M 10/054 |
| 2017/0279155 | A1* | 9/2017 | Sun ................. H01M 4/366 |
| 2018/0175359 | A1 | 6/2018 | Masson |
| 2019/0088923 | A1* | 3/2019 | Sastry ............... H01M 10/0562 |
| 2019/0252690 | A1* | 8/2019 | Miles ................. H01M 4/583 |
| 2021/0242550 | A1 | 8/2021 | Bradford et al. |

FOREIGN PATENT DOCUMENTS

| | | | | |
|---|---|---|---|---|
| WO | WO-2016037109 A1 * | 3/2016 | ........ | H01M 10/0436 |
| WO | WO 2018/134485 A1 | 7/2018 | | |
| WO | WO-2022113969 A1 * | 6/2022 | .......... | H01M 10/052 |
| WO | WO-2023112517 A1 * | 6/2023 | ........ | H01M 10/0562 |

OTHER PUBLICATIONS

Machine Translation of JP-2019061943-A (Mar. 11, 2025) (Year: 2025).*

International Search Report and Written Opinion for PCT/US2023/028668, dated Jul. 15, 2023, 12 pages.

Liu, et al., "Advanced electrode processing of lithium ion batteries: A review of powder technology in battery fabrication", *Particuology57*, (2021), pp. 56-71.

Deiner, et al., "Digital Printing of Solid-State Lithium-Ion Batteries", *Advanced Engineering Materials*, (2019), pp. 1-18.

* cited by examiner

METHODS FOR MANUFACTURING BATTERIES AND RELATED SYSTEMS

FEDERAL RESEARCH STATEMENT

This invention was made with Government support under Contract No. 89303321CEM000080, awarded by the U.S. Department of Energy. The Government has certain rights in the invention.

FIELD OF THE INVENTION

The present subject matter relates generally to the manufacture of batteries and, more particularly, to methods and related systems that use a cyclical or station-based approach for manufacturing 3-D structured batteries, such as 3-D lithium-ion batteries.

BACKGROUND OF THE INVENTION

3-D structured batteries, such as 3-D structured lithium-ion batteries, can provide numerous advantages over common 2-D planar batteries, such as 2-D planar lithium-ion batteries. However, the manufacture of such 3-D structured batteries is often quite complex and current manufacturing methods do not allow for any sufficient amount of scalability.

As such, there is a need for improved methods and related systems for manufacturing 3-D structured batteries.

BRIEF DESCRIPTION OF THE INVENTION

Aspects and advantages of the invention will be set forth in part in the following description, may be obvious from the description, or may be learned through practice of the invention.

In one aspect, the present subject matter is directed to a method for manufacturing a battery. The method includes forming a battery cell relative to a substrate using a layer-deposition sub-process. The layer-deposition sub-process includes: depositing a layer of first electrode material relative to the substrate to form a first electrode of the battery cell; depositing a first layer of electrolyte material on top of the layer of first electrode material; depositing a layer of second electrode material on top of the first layer of electrolyte material to form a second electrode of the battery cell; and depositing a second layer of electrolyte material on top of the layer of second electrode material. Additionally, the method includes cycling through the layer-deposition sub-process one or more additional times to form one or more additional battery cells relative to the substrate, with each additional battery cell being formed on top of a previously formed battery cell such that a battery cell stack is created relative to the substrate.

In another aspect, the present subject matter is directed to a method for manufacturing a battery. The method includes forming a battery cell relative to a substrate via execution of a layer-deposition sub-process. The layer-deposition sub-process includes separately depositing a plurality of layers of material one on top of the other relative to the substrate. The plurality of layers of material includes a layer of first electrode material, a first layer of electrolyte material, a layer of second electrode material, and a second layer of electrolyte material, with the layer of first electrode material being separated from the layer of second electrode material by either the first layer of electrolyte material or the second layer of electrolyte material. The method also includes cycling through the layer-deposition sub-process one or more additional times to form one or more additional battery cells relative to the substrate, with each additional battery cell being formed on top of a previously formed battery cell such that a battery cell stack is created relative to the substrate.

In a further aspect, the present subject matter is directed to a system for manufacturing a battery configured in accordance with one or more of the embodiments described herein.

These and other features, aspects and advantages of the present invention will become better understood with reference to the following description and appended claims. The accompanying figures, which are incorporated in and constitute a part of this specification, illustrate embodiments of the invention and, together with the description, serve to explain the principles of the invention.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the figures. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to methods and related systems for manufacturing 3-D structured batteries. A 3-D structured battery may include a plurality of electrolyte or battery cells stacked one-on-top of the other to form a battery cell stack. As will be described below, a cyclical, station-based approach may be used to manufacture the battery cell stack, with the various material layers of each battery cell being separately deposited relative to an underlying substrate at different workstations. Upon the formation of a given battery cell, the assembly can be cycled back through the workstations to allow a subsequent battery cell to be formed relative thereto. In several embodiments, an additive manufacturing technique(s) (e.g., a BAM technique) may be used to deposit one or more of the material layers of each battery cell.

Figure 1:
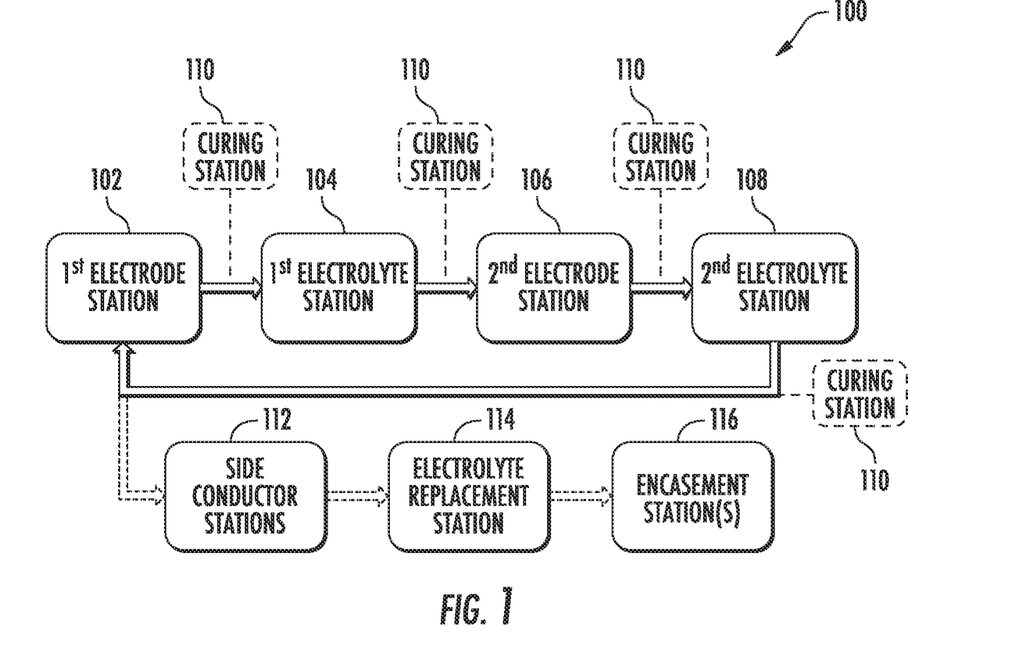
FIG. 1 illustrates a schematic view of various components of one embodiment of a system for manufacturing a 3-D structured battery in accordance with aspects of the present subject matter.

Referring now to the figures, FIG. 1 illustrates a schematic view of various components of one embodiment of a system 100 for manufacturing a 3-D structured battery in accordance with aspects of the present subject matter. In particular, FIG. 1 schematically illustrates various workstations of the system 100 that can be used to execute one or more sub-processes or processes during the formation of a 3-D structured battery, such as a 3-D structured lithium-ion battery.

As shown in FIG. 1, the system 100 includes various workstations at which different operations or steps of an inline additive manufacturing or layer-deposition sub-process can be performed during the manufacture of an electrolytic or battery cell (referred to hereinafter as simply a "battery cell") of the 3-D structured battery. Specifically, in the illustrated embodiment, the system 100 includes four separate layer-deposition workstations, namely a first electrode station 102, a first electrolyte station 104, a second electrode station 106, and a second electrolyte station 108, with each station being configured to deposit a separate layer of material used to form the battery cell. For instance, as will be described below, the first electrode station 102 may deposit a layer of first electrode material onto a surface of a substrate, after which the substrate is moved (e.g., via a conveyor, indicated by solid arrows) to the first electrolyte station 104 to allow a first layer of electrolyte material to be deposited on top of the layer of first electrode material. The substrate is then moved to the second electrode station 106, at which a layer of second electrode material is deposited on top of the first layer of electrolyte material. Thereafter, the substrate is moved to the second electrolyte station 108 to allow a second layer of electrolyte material to be deposited on top of the layer of second electrode material, thereby creating a battery cell. This sub-process may then be repeated over and over again to create a vertical stack of battery cells relative to the substrate. For instance, the substrate may be cycled through the various workstations 102, 104, 106, 108 a given number of times corresponding to the desired number of battery cells to be included within the battery cell stack.

In several embodiments, each electrode station 102, 106 may be equipped to deposit a respective electrode material (e.g., either a cathode material or anode material) using an additive manufacturing technique. For instance, as will be described below, each electrode station 102, 106 may, in one embodiment, utilize a band additive manufacturing (BAM) technique in which a band of electrode material is deposited via an array of nozzles. However, in other embodiments, the system 100 may utilize any other suitable additive manufacturing techniques, such as fused deposition modeling or direct ink writing, to deposit the electrode material during the formation of the associated battery cell.

As indicated above, at each electrolyte station 104, 108, a layer of electrolyte material is deposited on top of the previously deposited layer of electrode material. In several embodiments, the various layers of electrolyte material initially used to form the battery cell stack may correspond to layers of temporary or surrogate electrolyte material. For instance, as will be described below, layers of surrogate electrolyte material may be used during an initial stage of the manufacturing process and then subsequently removed/replaced with a final electrolyte material (e.g., a liquid electrolyte material) at a later point during the manufacturing process. In such embodiments, the layers of surrogate electrolyte material may serve as temporary structural or support layers within the battery cell stack. Alternatively, the various layers of electrolyte material used to form the battery cell stack may correspond to layers of a non-temporary or permanent electrolyte material. In other words, as opposed to depositing a surrogate electrolyte material, each electrolyte station 104, 108 may be configured to deposit the final or desired electrolyte material to be used within the battery (e.g., a solid electrolyte material, such as garnet-type lithium lanthanum zirconium oxides doped with different metals such as lanthanum, gallium, aluminum, niobium; perovskite-type materials such as lithium lanthanum titanate and lithium strontium tantalum zirconate; and solid polymer electrolytes containing lithium salts, 3-D printable polymers such as polylactic acid, polyethylene oxide, polyacrylonitrile, polymethyl methacrylate, polyvinylidene fluoride, and/or the like).

Various different manufacturing methodologies may be used to deposit the layer of electrolyte material at each electrolyte station 104, 108. In one embodiment, each layer of electrolyte material may correspond to a pre-manufactured component. In such an embodiment, the layer of electrolyte material may be deposited on top of the previously deposited layer of electrode material by placing the pre-manufactured component in position relative to the layer of electrode material, such as by using a robotic arm of the electrolyte station 104, 108 to place the pre-manufactured layer of electrolyte material on top of the previously deposited layer of electrode material. For instance, when using a surrogate electrolyte material as the layer of electrolyte material (e.g., a Teflon™ sheet or any other layer of releasable or non-stick solid material), the pre-manufactured layer of surrogate material may be placed (e.g., via the robotic arm or using any other suitable placement means) on top of the previously deposited layer of electrode material. In another embodiment, an additive manufacturing technique (e.g., a BAM technique) may be used to deposit the layer of electrolyte material on top of the previously deposited layer of electrode material by forming such electrolyte layer directly on top of the electrode layer. Such technique may be particularly advantageous when the layer of electrolyte material corresponds to a layer of non-temporary or permanent electrolyte material that will be maintained within the battery stack through completion of the manufacturing process. However, a suitable additive manufacturing technique may also be used in instances in which the layer of electrolyte material corresponds to a surrogate electrolyte material.

It should be appreciated that, in an alternative embodiment, the system 100 may only include three layer-deposition workstations. For instance, as opposed to having separate electrolyte workstations 104, 108, a single workstation may be configured to deposit both the first and second electrolyte layers. In such an embodiment, following the deposition of each cathode/anode layer, the substrate may be moved or conveyed to the same electrolyte workstation to allow the electrolyte layers to be deposited as required.

It should also be appreciated that, in addition to the various layer-deposition workstations 102, 104, 106, 108, the system 100 may also include other workstations, including intermediate workstations between successive layer-deposition workstations. For instance, in one embodiment, the system 100 may optionally include an intermediate curing station 110 positioned between one or more successive pairs of the layer-deposition workstations 102, 104, 106, 108. Specifically, in embodiments in which a layer of material is being deposited at a given workstation via an additive manufacturing technique, the intermediate curing station 110 may be used to reduce the required amount of curing time for the deposited material, thereby allowing for reduced time intervals between successive layer depositions. For instance, in one embodiment, each curing station 110 may correspond to a heating chamber or other suitable heated environment through which the substrate (and any material layers deposited thereon) can be transported (e.g., via a conveyor) as it is being moved between successive layer-deposition workstations 102, 104, 106, 108.

Additionally, as shown in FIG. 1, the system 100 may also include workstations for further processing an assembled battery cell stack. Specifically, in several embodiments, upon forming the battery cell stack with the desired number of battery cells, the system 100 may include one or more side conductor stations 112 that are configured to form side conduction bands along differing sides of the battery cell stack. For instance, as will be described below with reference to FIGS. 7 and 8, a layer of cathode material may be applied to one side of the battery cell stack while a layer of anode material may be applied to an opposed side of the battery cell stack, thereby allowing for the formation of a side cathode and a side anode along such sides of the battery cell stack. Additionally, in embodiments in which the electrolyte stations 104, 108 are configured to deposit layers of surrogate electrolyte material within the battery cells, the system 100 may include an electrolyte replacement station 114 to allow the surrogate electrolyte material to be replaced with the final electrolyte material. An example of an electrolyte replacement will be described below with reference to FIG. 10. Moreover, as shown in FIG. 1, the system 100 may also include one or more battery encasement stations 116 at which one or more outer frames, housings, endcaps, etc. are installed relative to the internal components of the battery (e.g., the battery cell stack) to fully or partially encase such components.

Figure 2:
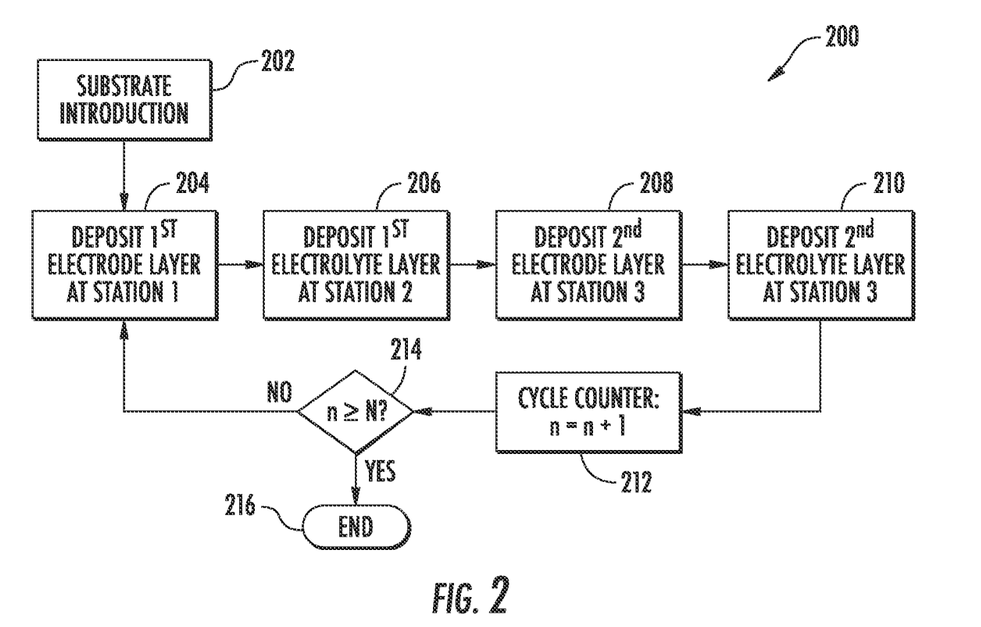
FIG. 2 illustrates example flow logic for executing an inline additive manufacturing or layer-deposition sub-process as part of an overall process for forming a battery cell stack of a 3-D structured battery in accordance with aspects of the present subject matter.

Referring now to FIG. 2, example flow logic 200 for executing an inline additive manufacturing or layer-deposition sub-process as part of an overall process for forming a battery cell stack of a 3-D structured battery is illustrated in accordance with aspects of the present subject matter. For purposes of description, the flow logic 200 will only be generally described with reference to the various layer-deposition workstations 102, 104, 106, 108 of the system 100 of FIG. 1. One of ordinary skill in the art will appreciate that the flow logic 200 may also include additional steps or sub-processes, such as additional steps or sub-processes associated with curing material layers between successive layer-deposition workstations 102, 104, 106, 108.

As shown in FIG. 2 at 202, the flow logic 200 includes the initial introduction of a substrate onto which the battery cell stack is to be formed. For instance, the substrate may correspond to a base substrate defining a support surface onto which an initial material layer will be deposited, and which will be relative to which additional material layers will be stacked as successive material layers are deposited to form each battery cell of the battery cell stack. In embodiments in which the system 100 is configured to automatically cycle the substrate through the various workstations, the substrate may be introduced into the system 100 by simply placing the substrate at the desired location along the cyclical flowpath. For instance, in one embodiment, a conveyor system may be configured to move the substrate through the various workstations and to loop the substrate back to the initial workstation. In such an embodiment, the substrate may be initially introduced onto the conveyor or conveying system at the first layer-deposition workstation 102 or at a location upstream of the first workstation 102.

Referring still to FIG. 2, at 204-210, the various material layers used to form a battery cell are successively deposited one on top of the other relative to the support surface defined by the substrate. Specifically, at 204, a layer of first electrode material (e.g., a layer of cathode material) is deposited onto the support surface (or on top of the previously formed battery cell for subsequent cycles) at the first workstation 102 to form a first electrode of the battery cell (e.g., a cathode of the battery cell). The substrate is then moved from the first workstation 102 to the second workstation 104 (e.g., via the conveying means) to allow a first layer of electrolyte material to be deposited onto the previously formed "first electrode" of the battery cell at 206. Thereafter, upon moving the substrate from the second workstation 104 to the third workstation 106 (e.g., via the conveying means), a layer of second electrode material (e.g., a layer of anode material) is deposited onto previously deposited electrolyte layer (e.g., at 208) to form a second electrode of the battery cell (e.g., an anode of the battery cell). The substrate is then moved from the third workstation 106 to the fourth workstation 108 (e.g., via the conveying means) to allow a second layer of electrolyte material to be deposited onto the previously formed "second electrode" of the battery cell at 206. It should be appreciated that, as indicated above, the first and second layers of electrolyte material may correspond to layers of surrogate electrolyte material or layers of the desired final electrolyte material.

In the illustrated flow logic 200, elements 204-210 are generally representative of an exemplary sub-process for forming a single battery cell. However, as described above, the disclosed system 100 (and related methods) may be used to manufacture a battery cell stack including a plurality of battery cells stacked one on top of the other. Thus, as shown in FIG. 2, upon completion of each cell or layer-deposition cycle represented by elements 204-210, the flow logic 200 includes, at 212, a cycle counter that records the number of cycles that have been completed. For instance, cycle number (n) corresponds to the number of completed cycles and, thus, the number of battery cells that have been formed relative to the substrate. As such, at initiation of the flow logic 200, the cycle number (n) is equal to zero and is increased by one at 212 upon completion of each cell or layer-deposition cycle. At 214, the current cycle number (n) is then compared to a pre-determined cycle threshold (N), which also corresponds to the desired number of battery cells to be included within the battery cell stack being formed. If the cycle number (n) is less than the pre-determined cycle number threshold (N), the flow logic 200 returns back to 204 to allow an additional battery cell to be formed on top of the previously formed battery cell. However, if the cycle number (n) is equal to (or greater than) the pre-determined cycle number threshold (N) (thereby indicating that the battery cell stack that has been formed relative to the substrate now includes the desired number of batter cells), the flow logic 200 may be terminated (e.g., at 216).

It should be appreciated that, although the flow logic 200 of FIG. 2 is generally described with reference to the formation of a single battery cell stack, multiple battery cell stacks may be manufactured simultaneously. For instance, upon the deposition of a first electrode layer onto the substrate and subsequent movement of the substrate to the second workstation, a new substrate may be loaded into the first workstation to allow for the deposition of a first electrode layer onto this newly loaded substrate. As this substrate is then moved to the second workstation, yet another substrate can be loaded into the first workstation and so on, thereby allowing for multiple battery cell stacks to be manufactured as the various substrates are being looped or cycled through the workstations (e.g., via a continuous or looped conveyer system).

Figure 3:
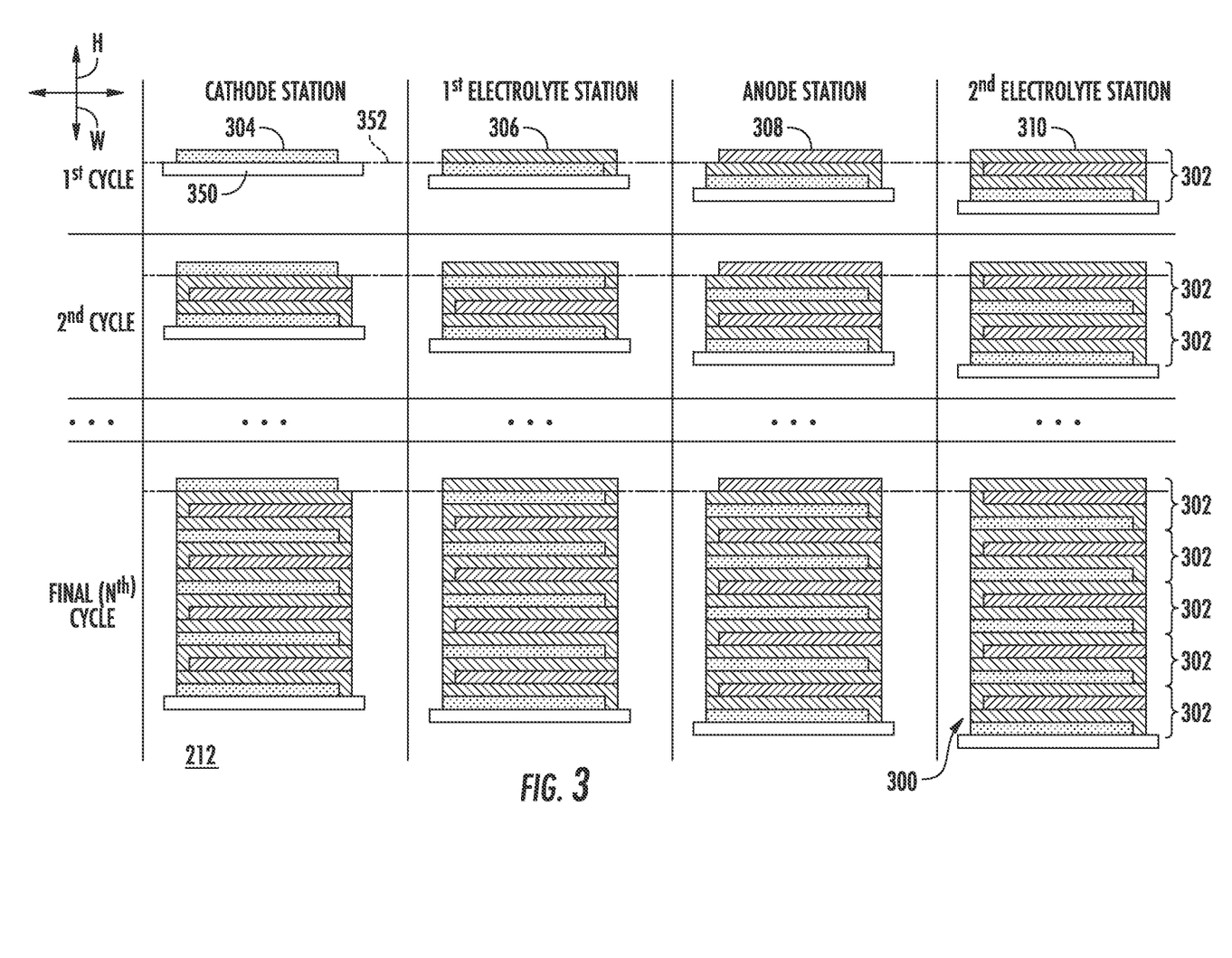
FIG. 3 illustrates a schematic diagram of an exemplary implementation of the flow logic of FIG. 2, particularly illustrating various exemplary layer-deposition cycles used to form a battery cell stack, including schematic depictions of the individual material layers deposited at each workstation during each individual layer-deposition cycle to form a given battery cell of the stack.

Referring now to FIG. 3, a schematic diagram illustrating an exemplary implementation of the flow logic 200, described above with reference to FIG. 2, is illustrated in accordance with aspects of the present subject matter. Specifically, FIG. 3 illustrates various exemplary layer-deposition cycles used to form a battery cell stack 300, including schematic depictions of the individual material layers deposited at each workstation during each individual layer-deposition cycle to form a given battery cell 302 of the stack 300. In the illustrated embodiment, the cathode, anode, and first electrolyte form a complete battery cell. The second electrolyte on the anode electrolytically connects the current battery cell to the next battery cell. Such electrolytic stacking of a plurality of battery cells via the second electrolyte forms a 3D battery. It should be appreciated that, for purposes of describing the embodiment of the various exemplary layer-deposition cycles shown in FIG. 3, the first electrode of each battery cell 302 will generally be described as a cathode and the second electrode of each battery cell 302 will generally be described as an anode. However, in an alternative embodiment, such designations may be reversed. Additionally, for purposes of describing the embodiment of the various exemplary layer-deposition cycles shown in FIG. 3, the first and second electrolyte layers will be described as surrogate electrolyte layers. However, as indicated above, such electrolyte layers may, instead, correspond to layers of the desired final electrolyte material.

As shown in FIG. 3, during the first layer-deposition cycle of the process, a layer of cathode material 304 is deposited onto a support surface defined by an associated substrate 350 (e.g., the top surface of the substrate 350) at the first workstation, thereby forming a cathode of the initial battery cell 302 being manufactured. The substrate 350 is then moved to the second workstation to allow a first layer of surrogate electrolyte material 306 to be deposited on top of the layer of cathode material 304. As shown, a portion of the first layer of surrogate electrolyte material 306 wraps around one of the ends of the layer of cathode material 304, which electrolytically commutes the end cathode from the "end anode side" of the battery stack 300 while leaving an exposed end of the cathode along the "cathode side" of the battery stack 30 (the anode and cathode sides of the battery cell stack will be described in greater detail below with reference to FIGS. 6-8). Still referring to the layer-deposition cycle of the illustrated process, the substrate 350 is then moved to the third workstation, at which point a layer of anode material 308 is deposited on top of the first layer of electrolyte material 306 to form the anode of the battery cell 302 being manufactured. Thereafter, the substrate 350 is moved to the fourth workstation to allow a second layer of surrogate electrolyte material 310 to be deposited on top of the layer of anode material 308, thereby completing the formation of the initial battery cell 302. As shown, a portion of the second layer of surrogate electrolyte material 310 wraps around one of the ends of the layer of anode material 308, which electrolytically commutes the end anode from the "end cathode side" of the battery stack 300 while leaving an exposed end of the anode along the "anode side" of the battery stack 300. It should be appreciated that the various material layers may be configured to be deposited along both a widthwise direction of the substrate 350 (indicated by arrow W in FIG. 3) and a lengthwise direction of the substrate 350 (not shown in FIG. 3—see FIGS. 4 and 5). Additionally, it should be appreciated that, in one embodiment, the support surface defined by the substrate 350 (e.g., the top surface of the substrate 350) may be coated with a non-stick material (e.g., Teflon™ or any other suitable non-stick material) prior to initial deposition of the first layer thereon, thereby allowing for removal of the battery cell stack from the substrate 350.

It should also be appreciated that, in one embodiment, each workstation may be configured to deposit a respective material layer onto the substrate 350 (or the previously deposited material layer) at a constant level or height (indicated by the dashed line 352 extending across each cycle). In such an embodiment, the substrate 350 may be configured to be incrementally lowered in a heightwise direction (indicated by arrow H in FIG. 3) following deposition of one material layer (and prior to deposition of the subsequent material layer) to allow for layer deposition to be completed at a common workstation height. For instance, in one embodiment, the substrate 350 may be supported via an actuatable platform that can be incrementally actuated in the heightwise direction H to lower the substrate 350 following each material layer deposition.

As shown in FIG. 3, following the initial layer-deposition cycle, the substrate 350 may be cycled back through the various workstations to allow a second battery cell 302 to be formed on top of the initial battery cell 302 using the same layer-deposition process. Similar to that described above, the substrate 350 may be incrementally lowered following the deposition of each material layer to maintain a common workstation height 352 for layer deposition. This same cycle can then be repeated any suitable number of times (as indicated by the series of ellipses in the third row) to form a corresponding number of battery cells 302 relative to the support surface of the substrate 350. During the final ($N^{th}$) layer-deposition cycle, the last battery cell 302 is formed using the same process as described above, at which point a battery cell stack 300 having the desired number of battery cells 302 has been assembled.

It should be appreciated that, simply for illustrative purposes, the final battery stack 300 is shown in FIG. 3 as including five battery cells 302. In general, the battery stack 302 formed using the disclosed systems/methods may have any number of battery cells 302 including, but not limited to, four or fewer battery cells or six or more battery cells.

Figure 4:
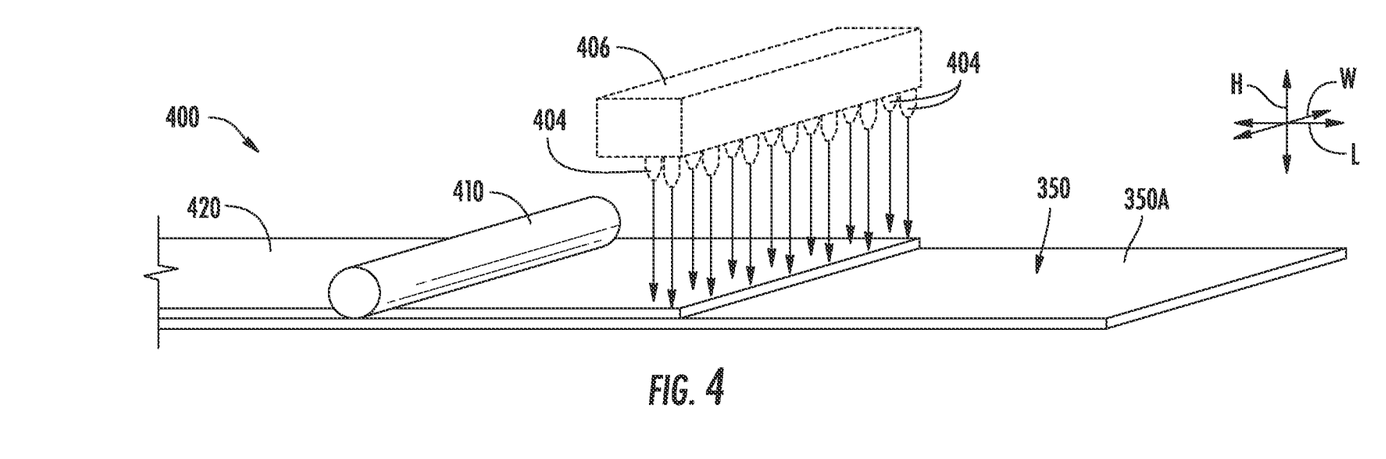
FIG. 4 illustrates a schematic view of one embodiment of a layer-deposition workstation configured to utilize a band additive manufacturing (BAM) technique in accordance with aspects of the present subject matter.

Referring now to FIG. 4, a schematic view of one embodiment of a layer-deposition workstation 400 configured to utilize a BAM technique is illustrated in accordance with aspects of the present subject matter. In several embodiments, the illustrated workstation 400 may correspond to any of the various workstations described above, such as one or more of the layer-deposition workstations 102, 104, 106, 108. As such, it should be appreciated that the associated BAM technique may be used to deposit one or more of material layers 402 when forming the battery cells 302 described above, such as one or both of the layers of electrode materials (e.g., the layer of cathode material and/or the layer of anode material) and/or one or more of the layers of electrolyte material.

As shown in FIG. 4, when using a BAM technique, the workstation 400 includes an array of nozzles 404 to allow a band or continuous layer of material 402 to be deposited onto an underlying substrate or previous layers, such as the substrate or layers 350, 304, 306, 308, or 310 described above. Specifically, in the illustrated embodiment, each nozzle 404 is offset from all of the other nozzles 404 in the widthwise direction (indicated by arrow W) of the substrate or layers 350, 304, 306, 308, or 310. Additionally, as shown in FIG. 4, the nozzle array includes two rows of nozzles 404, with the first row of nozzles 404 being offset from the second row of nozzles 404 in a longitudinal direction (indicated by arrow L) of the substrate or layers 350, 304, 306, 308, or 310 to allow the widthwise spacing of the nozzles 404 to be minimized and, thus, to ensure that a continuous band of material is deposited across the width of the layers 350, 304, 306, 308, or 310. It should be appreciated that, in one embodiment, each nozzle 404 may be separately coupled to a respective material source associated with the workstation 400 for supplying the material to be deposited to such nozzle. Alternatively, as shown in FIG. 4, all of the nozzles 404 may be coupled to a common material source 406 of the workstation 400 (e.g., a common printhead or similar material source) for supplying the desired material thereto.

In one embodiment, the substrate 350 and layer stack above may remain stationary during the material deposition process, with the array of nozzles 404 being actuatable or movable relative to the substrate 350 and layer stack above to allow a band of material 402 of a given length to be deposited onto the substrate or layers 350, 304, 306, 308, or 310 in the lengthwise direction L. Alternatively, the nozzles 404 may be stationary, with the substrate 350 and layer stack above being moved relative to the nozzles 404 as the band of material 402 is being deposited thereon. For instance, assuming that the substrate 350 is configured to be conveyed through the workstation 400, the nozzles 404 may be configured to deposit a continuous band or layer of material 402 along the substrate 350 as it moved past the nozzles 404. Additionally, and as shown in FIG. 4, in one embodiment, the workstation 400 may include an optional roller 410 that is configured to assist in providing a uniform material distribution and/or a uniform layer thickness across the widthwise direction W of the substrate 350. For instance, the roller 410 may be configured to apply a given amount of pressure to the deposited layer of material or may be set a pre-determined height relative to an upper support surface 350A of the substrate 350 to achieve the desired material distribution/thickness.

Figure 5:
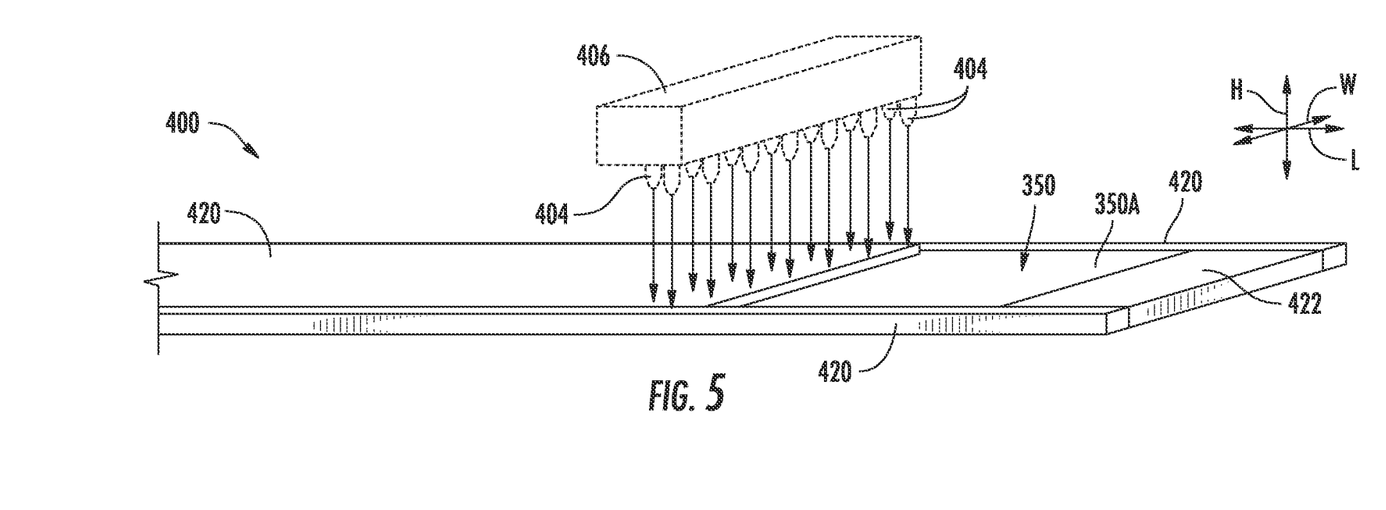
FIG. 5 illustrates a schematic view of another embodiment of the layer-deposition workstation shown in FIG. 4 in accordance with aspects of the present subject matter.

Referring now to FIG. 5, a schematic view of another embodiment of the layer-deposition workstation 400 shown in FIG. 4 is illustrated in accordance with aspects of the present subject matter. As shown in FIG. 5, unlike the embodiment described above with reference to FIG. 4, the material deposition area defined along the substrate 350 or top layer being deposited is framed by a plurality of walls 420, 422, thereby providing improved dimensional control of the deposited layer of material 402 and by also reducing material/heat loss at the sides/ends of such layer 402. Specifically, a pair of sidewalls 420 are provided that generally define the maximum width of the layer of deposited material 402 in the widthwise direction W. Moreover, as shown in FIG. 5, a pair of endwalls 420 (only one of which is shown) are provided at the longitudinal ends of the substrate 350 that generally define the maximum length of the layer of deposited material 402 in the lengthwise direction L. The sidewalls 420 and endwalls 422 may also function to prevent material/heat loss along the sides/ends of the substrate 350 during the deposition process. For instance, in one embodiment, the height of each wall 420, 422 may be slightly less than the distance defined between each nozzle 404 and the support surface 350A of the substrate 350. As a result, the endwalls 422 may, for example, block material flow from the nozzles 402 as each endwall 422 passes underneath the nozzles 404 (or as the nozzles 404 move past the endwalls 422).

Figure 6:
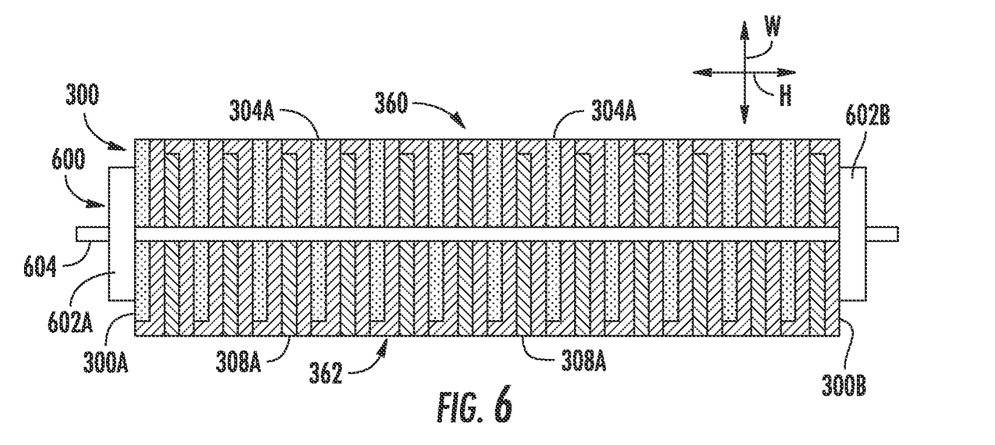
FIG. 6 illustrates a schematic, side view of one embodiment of a battery cell stack in accordance with aspects of the present subject matter, particularly illustrating the battery cell stack positioned within a fixture.
Figure 7:
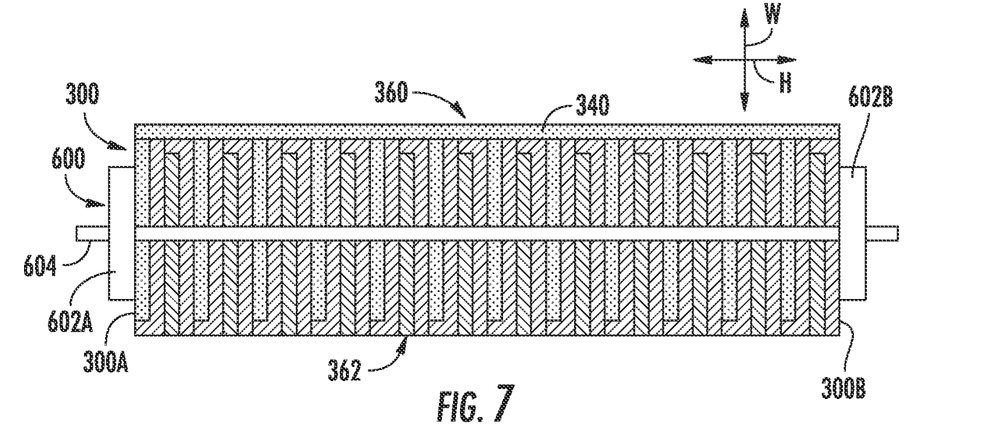
FIG. 7 illustrates a schematic, side view of the battery cell stack shown in FIG. 6 after a layer of cathode material has been deposited along a cathode side of the battery cell stack.
Figure 8:
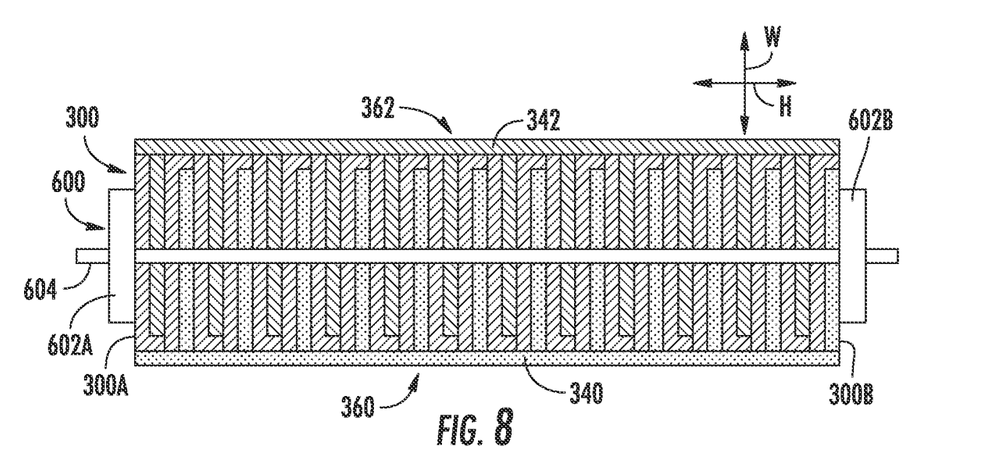
FIG. 8 illustrates a schematic, side view of the battery cell stack shown in FIG. 7 after a layer of anode material has been deposited along an anode side of the battery cell stack.

Referring now to FIGS. 6-8, example views of an assembled battery cell stack 300 turned on its side are illustrated in accordance with aspects of the present subject matter, particularly illustrating the battery cell stack 300 after: a fixture 600 has been installed relative thereto (FIG. 6); a layer of cathode material has been deposited along one side of the battery cell stack 600 to form a heightwise extending "side" cathode 340 thereon (FIG. 7); and a layer of anode material has been deposited along the opposed side of the battery cell stack 600 to form a heightwise extending "side" anode 342 thereon (FIG. 8). As indicated above with reference to FIG. 1, upon forming a battery cell stack 300 with the desired number of battery cells, the battery cell stack 300 may be delivered (e.g., via a conveyor system) to one or more side conductor stations 112 (FIG. 1) configured to form elongated side conduction bands along differing sides of the battery cell stack 300. For instance, in one embodiment, the battery cell stack 300 may be initially delivered to a first side conductor station (e.g., a side cathode station) prior to be delivered to a downstream, second side conductor station (e.g., a side anode station).

As particularly shown in FIG. 6, prior to delivery of the battery cell stack 300 to either of the side conductor stations, the stack 300 may, in one embodiment, be positioned on its side and placed within a fixture 600 configured to apply a compressive force in the heightwise direction H of the stack 300 (i.e., the direction in which the battery cells were initially stacked to form the battery cell stack 300). In one embodiment, the fixture 600 may include first and second end plates 602A, 602B configured to be placed adjacent to the heightwise ends 300A, 300B of the battery cell stack 300 and a pair of tie rods 604 (only one of which is shown) extending between the end plates 602A, 602B along the sides of the battery cell stack 300 to allow the stack 300 to be compressed between the end plates 602A, 602B in the heightwise direction H. However, in other embodiments, the fixture 600 may have any other suitable configuration that allows the application of a compressive force against the heightwise ends 300A, 300B of the stack 300.

Additionally, as shown in FIG. 6 and as described above with reference to FIG. 3, the battery cell stack 600 may be formed such that the various cathodes 304 have exposed ends 304A along a cathode side 360 of the stack 300, while the various anodes 308 have exposed ends 308A along an anode side 362 of the stack 300. As such, elongated "side" cathodes and anodes 340, 342 may be formed along the respective cathode and anode sides 360, 362 of the stack 300, thereby allowing all of the cathodes 304 to be electrically connected to the elongated side cathode and all of the anodes 308 to be electrically connected to the elongated side anode.

As particularly shown in FIG. 7, during the formation of the elongated side cathode 340 within the associated side conductor station, the battery cell stack 300 may be oriented with the cathode side 360 of the stack 300 facing upwardly, thereby allowing a layer of cathode material to be deposited along the cathode side 360 of the stack 600 such that the elongated side cathode 340 electrically contracts each of the exposed ends 304A of the cathodes 304 contained within the battery cell stack 300. Thereafter, prior to delivery of the battery cell stack 300 to the downstream side conductor station, the battery cell stack 300 may be flipped 180 degrees to expose the opposed, anode side 362 of the stack 300. For instance, as particularly shown in FIG. 8, during the formation of the elongated side anode 342 within downstream side conductor station, the battery cell stack 300 may be oriented with the anode side 362 of the stack 300 facing upwardly, thereby allowing a layer of anode material to be deposited along the anode side 362 of the stack 300 such that the elongated side anode 342 electrically contracts each of the exposed ends 308A of the anodes 308 contained within the battery cell stack 300.

It should be appreciated that, to ensure proper electrical contact between the side cathode 340 and the internal cathodes 304 and between the side anode 342 and the internal anodes 308, it may be desirable, in several embodiments, to apply a compressive force against the cathode/anode sides 360, 362 of the battery cell stack 300 following formation of the side conduction bands 340, 342. For instance, in one embodiment, an additional fixture may be installed onto the battery cell stack 300 that provides a compressive force in the widthwise direction W of the stack 300. Alternatively, the heightwise extending fixture 600 may be removed and the entire assembly placed into a separate fixture or frame that applies both a heightwise and widthwise compressive force to compress the assembly together.

It should also be appreciated that the side conduction bands 340, 342 may be deposited onto the respective sides of the battery cell stack 300 using any suitable manufacturing process or method. For instance, in one embodiment, each side conductor station may be configured to deposit electrode material along the respective side of the battery cell stack 300 using an additive manufacturing technique, such as a BAM technique. Alternatively, the side conduction bands 340, 342 may correspond to pre-manufactured components, in which case each side conduction band may simply be positioned along its respective side of the battery cell stack 300.

Figure 9:
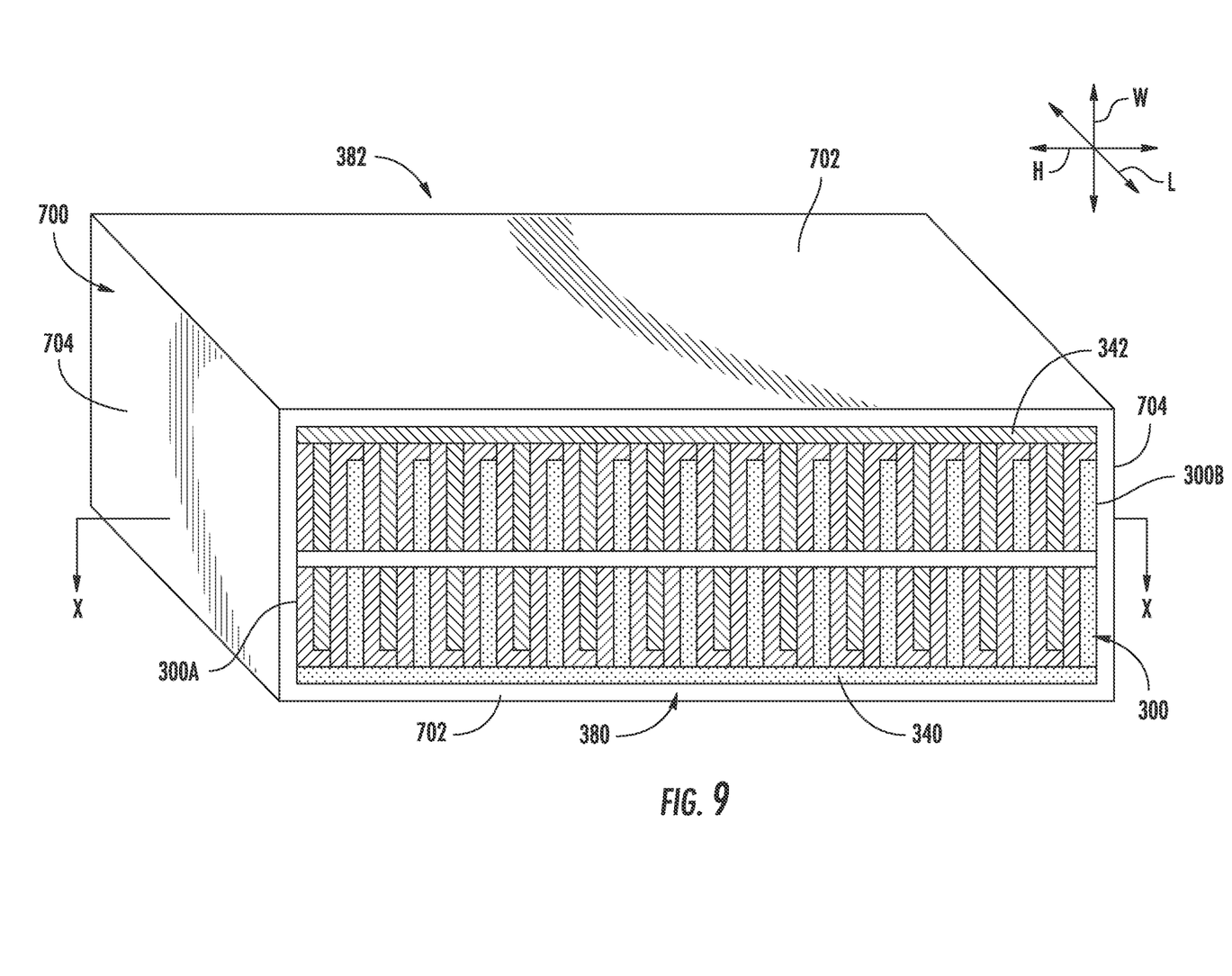
FIG. 9 illustrates a perspective view of a battery cell stack partially encased within an open-ended frame in accordance with aspects of the present subject matter.

Following formation of the side conduction bands onto the battery cell stack 300, the stack 300 may then, in several embodiments, be at least partially encased. For instance, FIG. 9 illustrates a perspective view of the battery cell stack 300 (including the side conduction bands 340, 342) positioned within a frame 700 forming an open-ended housing for the stack 300. Specifically, as shown in FIG. 9, the frame 700 includes opposed frame sidewalls 702 that extend in the heightwise and lengthwise directions H, L along the cathode and anode sides 360, 362 of the battery cell stack 300 to cover the side conduction bands 340, 342. Additionally, the frame 700 includes opposed frame endwalls 704 that extend in the widthwise and lengthwise directions W, L to cover the heightwise or top/bottom ends 300A, 300B of the stack 300. It should be appreciated that the frame 700 may be formed from an insulative material to prevent a short circuit between the anode and the cathode.

As a result of such configuration, the frame 700 defines an open end (only one of which is shown in FIG. 9) along both a front side 380 of the stack 300 and a rear side 382 of the stack 300. As will be described below with reference to FIG. 10, this open-ended frame configuration may allow for removal of the surrogate electrolyte material contained within the battery cell stack 300 and replacement of such material with a final electrolyte material. However, in embodiments in which the layers of electrolyte material deposited within the battery cell stack 300 correspond to the final electrolyte material, the frame 700 may have a different configuration or may be replaced with a housing or enclosure configured to encompass the entirety of the battery cell stack 300.

Figure 10:
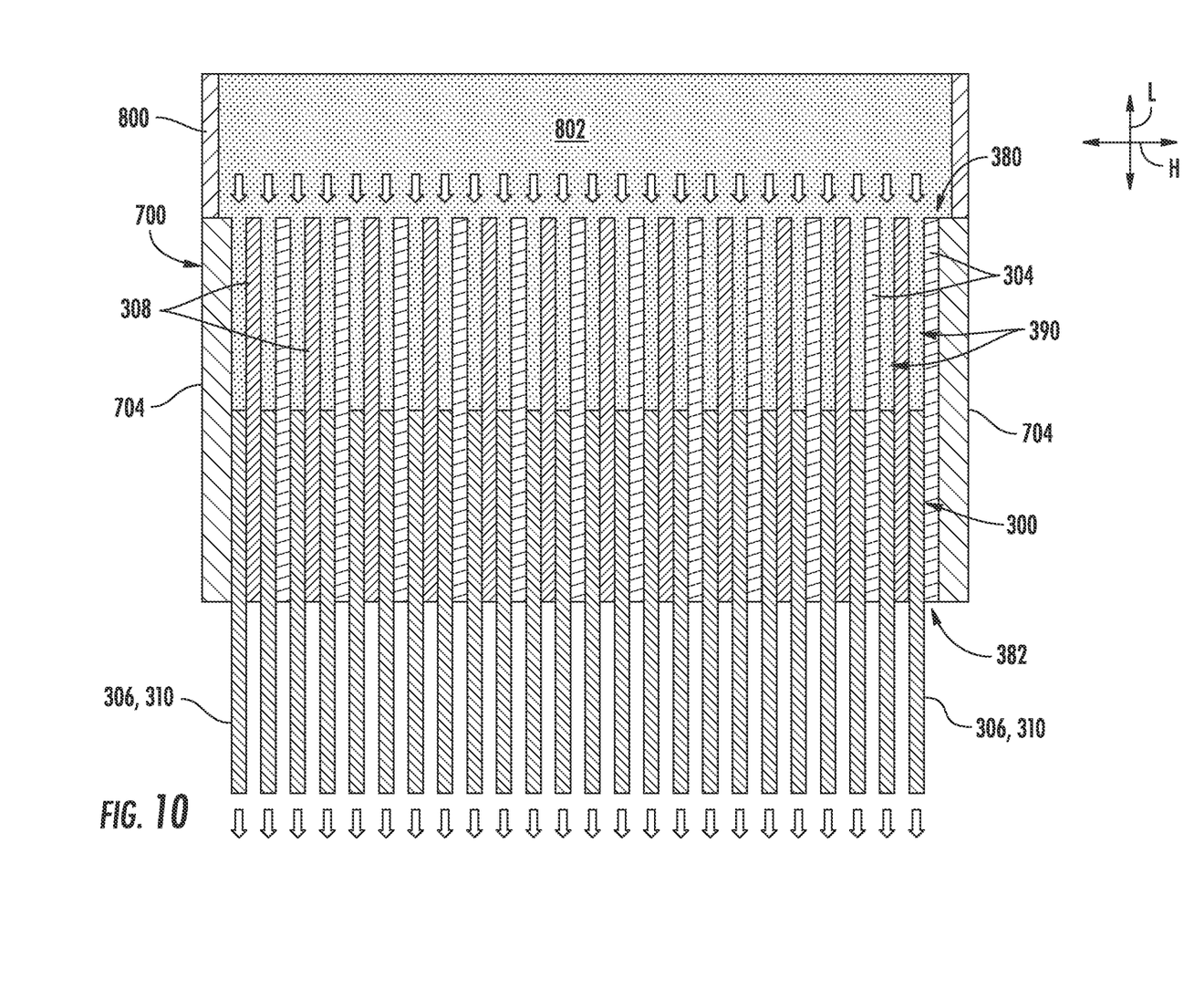
FIG. 10 illustrates a schematic, cross-sectional view of the framed battery cell stack shown in FIG. 9 in accordance with aspects of the present subject matter, particularly illustrating an example electrolyte replacement procedure that may be performed to replace surrogate electrolyte material with a final electrolyte material.

Referring now to FIG. 10, a schematic, cross-sectional view of the framed battery cell stack 300 shown in FIG. 9 is illustrated in accordance with aspects of the present subject matter, particularly illustrating an example electrolyte replacement procedure that may be performed to replace surrogate electrolyte material with a final electrolyte material. Specifically, FIG. 10 illustrates a cross-sectional view of the framed battery cell stack 300 shown in FIG. 9 taken about line X-X, with the framed stack 300 flipped upwardly 90 degrees so that the open ends of the frame 700 are at the top and bottom of the framed stack 300.

By orienting the framed battery cell stack 300 as shown in FIG. 10, a source 800 of liquid electrolyte 802 may be positioned adjacent to one of the open ends of the frame 700 to allow the liquid electrolyte 892 contained therein to be provided in fluid communication with the battery cell stack 300. For instance, in the illustrated embodiment, the liquid electrolyte source 800 is positioned on top of the open end of the frame 700 defined at the front side 380 of the battery cell stack 300, thereby placing the liquid electrolyte 802 in fluid communication with such side 380 of the stack 300. Thereafter, the layers of surrogate electrolyte material 306, 310 may be removed from the opposed side of the framed stack 300 (e.g., the back side 382 of the stack 300). As indicated above, the layers of surrogate electrolyte material 306, 301 may, in one embodiment, correspond to Teflon™ sheets or other layers of releasable or non-stick solid material. As a result, the various layers 306, 310 may simply be pulled out of the battery cell stack 300.

As the layers of surrogate electrolyte material 306, 310 are being removed, the liquid electrolyte 802 may flow into and occupy the interelectrode gaps 390 that were previously occupied by the surrogate material 306, 310 (i.e., the gaps defined between adjacent cathodes/anodes 304, 308 within battery cell stack 300). Specifically, in one embodiment, the liquid electrolyte 802 may be allowed to passively flow into the interelectrode gaps 390 of the battery cell stack 300, driven primarily by gravity and the vacuum created behind each layer of surrogate electrolyte material 306, 310 as it is pulled from the battery cell stack 300. Alternatively, a back-pressure may be applied to the liquid electrolyte 802 contained within the source 800 to assist in directing the liquid electrolyte 802 into the interelectrode gaps 890. Surface tension or capillary action between adjacent cathodes/anodes 304, 308 may generally be sufficient to maintain the liquid electrolyte 802 within the interelectrode gaps 390 following removal of the layers of surrogate electrolyte material 306, 310.

Figure 11:
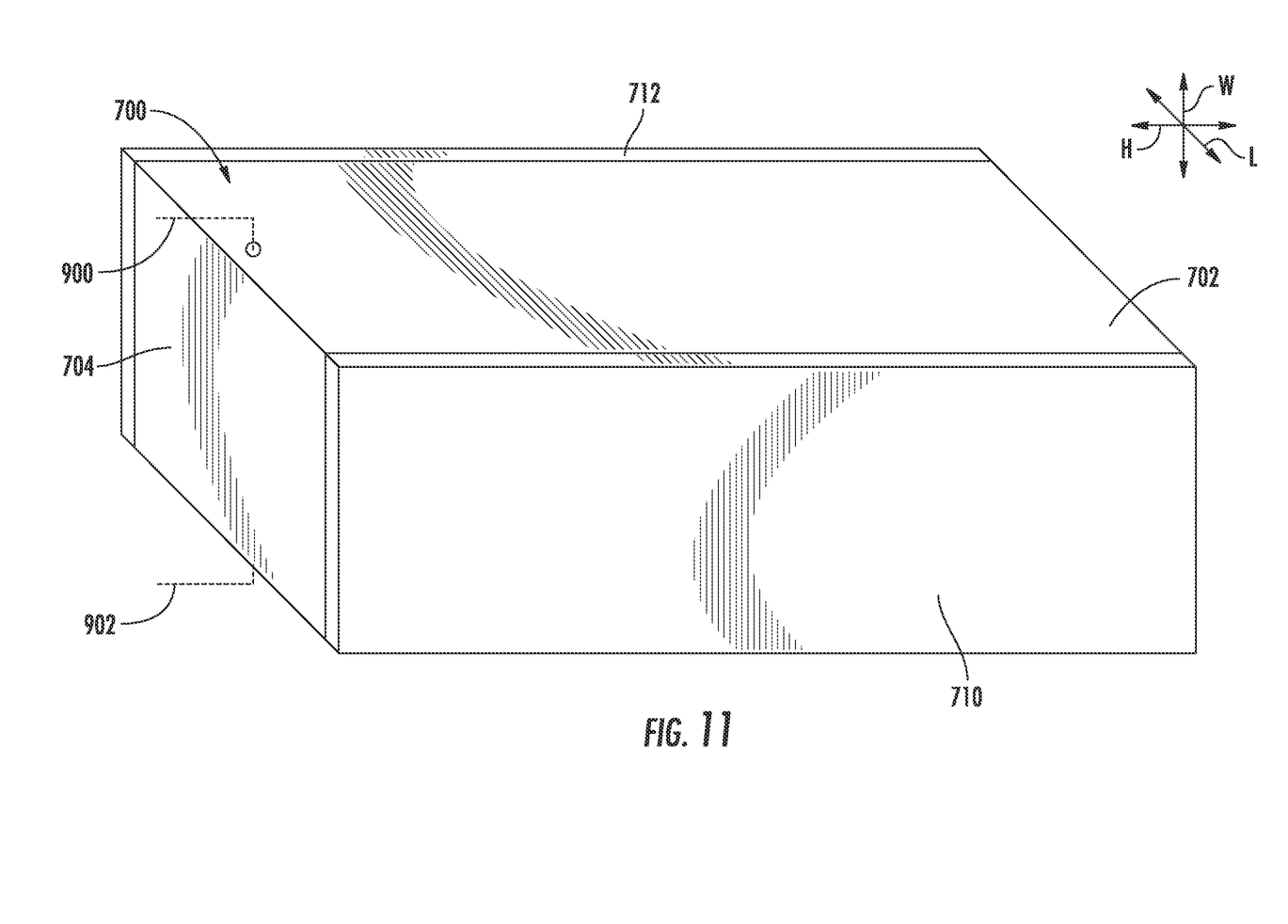
FIG. 11 illustrates another perspective view of the framed battery cell stack shown in FIG. 9 after endcaps have been installed relative to the open ends of the frame.

Upon completion of the electrolyte replacement procedure, the open ends of the frame 700 may be capped or covered to fully enclose the battery cell stack 300 and the other internal components of the 3-D structured battery. For instance, FIG. 11 illustrates another perspective view of the framed stack shown in FIG. 9 after front and rear endcaps 710, 712 have been installed relative to the open ends of the frame 700, thereby fully encasing the battery cell stack 300. Additionally, as shown in FIG. 11, electrical contacts 900, 902 for the cathode and the anode may be provided on the frame 700 along the cathode and anodes sides of the battery cell stack 300.

It should be appreciated that, when the various layers of electrolyte material forming the battery cell stack correspond to layers of a non-temporary or permanent electrolyte material (e.g., solid electrolyte layers), the above-described electrolyte replacement procedure need not be performed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for manufacturing a battery, the method comprising:
   forming a battery cell relative to a substrate using a layer-deposition sub-process, the layer-deposition sub-process comprising:
      depositing a layer of first electrode material relative to the substrate to form a first electrode of the battery cell;
      depositing a first layer of electrolyte material on top of the layer of first electrode material such that the first layer of electrolyte material wraps around an end of the layer of first electrode material;
      depositing a layer of second electrode material on top of the first layer of electrolyte material to form a second electrode of the battery cell; and
      depositing a second layer of electrolyte material on top of the layer of second electrode material; and
   cycling through the layer-deposition sub-process one or more additional times to form one or more additional battery cells relative to the substrate, with each additional battery cell being formed on top of a previously formed battery cell such that a battery cell stack is created relative to the substrate.

2. The method of claim 1, wherein:
   depositing the layer of first electrode material relative to the substrate comprises depositing the layer of first electrode material relative to the substrate at a first workstation;
   depositing the first layer of electrolyte material on top of the layer of first electrode material comprises depositing the first layer of electrolyte material on top of the layer of first electrode material at a second workstation;
   depositing the layer of second electrode material on top of the first layer of electrolyte material comprises depositing the layer of second electrode material on top of the first layer of electrolyte material at a third workstation; and
   depositing the second layer of electrolyte material on top of the layer of second electrode material comprises depositing the second layer of electrolyte material on top of the layer of second electrode material at a fourth workstation.

3. The method of claim 2, wherein the layer-deposition sub-process further comprises:
   moving the substrate from the first workstation to the second workstation after depositing the layer of first electrode material relative to the substrate;
   moving the substrate from the second workstation to the third workstation after positioning the first layer of electrolyte material on top of the layer of first electrode material; and
   moving the substrate from the third workstation to the fourth workstation after positioning the layer of second electrode material on top of the first layer of electrolyte material.

4. The method of claim 1, wherein the layer-deposition sub-process further comprises incrementally lowering the substrate after the deposition of each layer of material relative thereto.

5. The method of claim 1, wherein the first and second layers of electrolyte material comprise first and second layers of surrogate electrolyte material.

6. The method of claim 5, further comprising:
   curing the first and second layers of surrogate electrolyte material;
   removing the first and second layers of surrogate electrolyte material from each battery cell of the battery cell stack; and
   filling inter-electrode gaps previously occupied by the first and second layers of surrogate electrolyte material from each battery cell with a liquid electrolyte.

7. The method of claim 6, wherein the liquid electrolyte passively flows into the inter-electrode gaps as the first and second layers of surrogate electrolyte material are being removed from each battery cell of the battery cell stack.

8. The method of claim 1, further comprising:
   depositing a layer of first electrode material along a side of the battery cell stack to form a first side conduction band of the battery stack, the first side conduction band being connected to the first electrode of each battery cell of the battery cell stack; and
   depositing a layer of second electrode material along a different side of the battery stack to form a second side conduction band of the battery stack, the second side conduction band being connected to the second electrode of each battery cell of the battery cell stack.

9. The method of claim 1, wherein at least one of the layers of first electrode material, the first layer of electrolyte material, the layer of second electrode material, or the second layer of electrolyte material is deposited relative to the substrate using a band additive manufacturing (BAM) technique.

10. The method of claim 1, further comprising at least partially encasing the battery cell stack.

11. A method for manufacturing a battery, the method comprising:

forming a battery cell relative to a substrate via execution of a layer-deposition sub-process, the layer-deposition sub-process comprising:
 separately depositing a plurality a layers of material one on top of the other relative to the substrate, the plurality of layers of material including a layer of first electrode material, a first layer of electrolyte material, a layer of second electrode material, and a second layer of electrolyte material, the layer of first electrode material being separated from the layer of second electrode material by either the first layer of electrolyte material or the second layer of electrolyte material; and
 cycling through the layer-deposition sub-process one or more additional times to form one or more additional battery cells relative to the substrate, with each additional battery cell being formed on top of a previously formed battery cell such that a battery cell stack is created relative to the substrate;
 wherein the first layer of electrolyte material is deposited such that the first layer of electrolyte material wraps around an end of the layer of first electrode material.

12. The method of claim 11, wherein separately depositing the plurality of layers of material comprises:
 depositing the layer of first electrode material relative to the substrate at a first workstation;
 depositing the first layer of electrolyte material relative to the substrate at a second workstation;
 depositing the layer of second electrode material relative to the substrate at a third workstation; and
 depositing the second layer of electrolyte material relative to the substrate at a fourth workstation.

13. The method of claim 12, wherein the layer-deposition sub-process further comprises:
 moving the substrate from the first workstation to the second workstation after depositing the layer of first electrode material relative to the substrate;
 moving the substrate from the second workstation to the third workstation after positioning the first layer of electrolyte material on top of the layer of first electrode material; and
 moving the substrate from the third workstation to the fourth workstation after positioning the layer of second electrode material on top of the first layer of electrolyte material.

14. The method of claim 11, wherein the layer-deposition sub-process further comprises incrementally lowering the substrate after the deposition of each layer of material relative thereto.

15. The method of claim 11, wherein the first and second layers of electrolyte material comprise first and second layers of surrogate electrolyte material.

16. The method of claim 15, further comprising:
 removing the first and second layers of surrogate electrolyte material from each battery cell of the battery cell stack; and
 filling inter-electrode gaps previously occupied by the first and second layers of surrogate electrolyte material from each battery cell with a liquid electrolyte.

17. The method of claim 16, wherein the liquid electrolyte passively flows into the inter-electrode gaps as the first and second layers of surrogate electrolyte material are being removed from each battery cell of the battery cell stack.

18. The method of claim 11, further comprising:
 depositing a layer of first electrode material along a side of the battery cell stack to form a first side conduction band of the battery stack, the first side conduction band being connected to the first electrode of each battery cell of the battery cell stack; and
 depositing a layer of second electrode material along a different side of the battery stack to form a second side conduction band of the battery stack, the second side conduction band being connected to the second electrode of each battery cell of the battery cell stack.

19. The method of claim 11, wherein at least one of the layers of first electrode material, the first layer of electrolyte material, the layer of second electrode material, or the second layer of electrolyte material is deposited relative to the substrate using a band additive manufacturing (BAM) technique.

20. The method of claim 11, further comprising at least partially encasing the battery cell stack.

21. The method of claim 1, wherein the first electrode material is a cathode material and the second electrode material is an anode material.

* * * * *